United States Patent
Krishnan et al.

(10) Patent No.: US 12,432,636 B2
(45) Date of Patent: Sep. 30, 2025

(54) TECHNIQUES FOR PERFORMING LAYER 1/LAYER 2 MOBILITY BASED ON MULTIPLE SECONDARY CELL GROUP CONFIGURATIONS

(71) Applicant: QUALCOMM Incorporated, San Diego, CA (US)

(72) Inventors: Shankar Krishnan, San Diego, CA (US); Rajeev Kumar, San Diego, CA (US); Ozcan Ozturk, San Diego, CA (US); Punyaslok Purkayastha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 17/948,734

(22) Filed: Sep. 20, 2022

(65) Prior Publication Data
US 2024/0098603 A1    Mar. 21, 2024

(51) Int. Cl.
*H04W 36/30* (2009.01)
*H04W 36/00* (2009.01)
*H04W 76/15* (2018.01)
*H04W 76/18* (2018.01)

(52) U.S. Cl.
CPC ..... *H04W 36/305* (2018.08); *H04W 36/0079* (2018.08); *H04W 76/15* (2018.02); *H04W 76/18* (2018.02)

(58) Field of Classification Search
None
See application file for complete search history.

(56) References Cited

U.S. PATENT DOCUMENTS

2022/0182894 A1    6/2022    Damnjanovic et al.

FOREIGN PATENT DOCUMENTS

| WO | 2022074602 A1 |   | 4/2022 |
|----|---------------|---|--------|
| WO | 2022159015 A1 |   | 7/2022 |
| WO | WO2024030907  | * | 8/2022 |
| WO | WO2024033139  | * | 8/2022 |
| WO | WO2024039278  | * | 8/2022 |

(Continued)

OTHER PUBLICATIONS

International Search Report and Written Opinion—PCT/US2023/073318—ISA/EPO—Jan. 15, 2024.

(Continued)

*Primary Examiner* — Mohammad S Adhami
(74) *Attorney, Agent, or Firm* — Arent Fox, LLP

(57) ABSTRACT

Aspects described herein relate to improving layer 1 (L1)/layer 2 (L2) mobility in certain scenarios. In some aspects, an indication of mobility from a first cell in a candidate cell set configured for L1/L2 mobility to a second cell can be received, and one or more parameters related to mobility failure or mobility history or radio link failure (RLF) associated with the mobility to assist the network node in at least one of performing a subsequent L1/L2 mobility for the UE or avoiding RLF or mobility failure during the subsequent L1/L2 mobility can be transmitted. In other aspects, the indication of mobility can be transmitted and the one or more parameters can be received. In some aspects, a list of conditional primary secondary cell (PSCell) change (CPC) configurations can be communicated following a PCell switch.

30 Claims, 11 Drawing Sheets

(56) References Cited

FOREIGN PATENT DOCUMENTS

WO      WO2024049343     *   8/2022

OTHER PUBLICATIONS

Qualcomm Incorporated: "L1/L2 Mobility-General Concepts and Configuration", 3GPP TSG-RAN WG2 Meeting #119-e, R2-2207340, 3rd Generation Partnership Project, Mobile Competence Centre, 650, Route Des Lucioles, F-06921 Sophia-Antipolis Cedex, France, vol. RAN WG2, No. Electronic, Aug. 15, 2022-Aug. 26, 2022, Aug. 8, 2022, 6 Pages, XP052260662, p. 4, Figure 4, Sec 2, Par [02.5], Par [02.6], pp. 1-5, Sec 2.1, 2.4, Par 2.1, See sec 1 and 2.1-2.4, par [0105]-[0111], figure 7.

* cited by examiner

TECHNIQUES FOR PERFORMING LAYER 1/LAYER 2 MOBILITY BASED ON MULTIPLE SECONDARY CELL GROUP CONFIGURATIONS

FIELD OF THE DISCLOSURE

Aspects of the present disclosure relate generally to wireless communication systems, and more particularly, to techniques for performing layer 1/layer 2 mobility.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

Some devices (e.g., user equipment (UEs)) may be capable of performing layer 1/layer 2 mobility, which may include performing mobility between cells at the physical (PHY) layer and/or media access control (MAC) layer, but not at the radio resource control (RRC) layer. In addition, the devices can be configured with multiple cell groups, such as a master cell group (MCG) and one or more secondary cell groups (SCGs), where each group can include a primary cell and one or more secondary cells. The devices can be configured to perform L1/L2 mobility across cells within or among the various cell groups.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a processor, memory coupled with the processor, and instructions stored in the memory. The instructions are operable, when executed by the processor, to cause the apparatus to receive, from a network node, an indication of mobility from a first cell in a candidate cell set configured for layer 1 (L1)/layer 2 (L2) mobility to a second cell, and transmit, to a network node, one or more parameters related to mobility failure or mobility history or radio link failure (RLF) associated with the mobility to assist the network node in at least one of performing a subsequent L1/L2 mobility for the apparatus or avoiding RLF or mobility failure during the subsequent L1/L2 mobility.

According to another aspect, an apparatus for wireless communication is provided that includes a processor, memory coupled with the processor, and instructions stored in the memory. The instructions are operable, when executed by the processor, to cause the apparatus to transmit, to a user equipment (UE), a network node, an indication of mobility from a first cell in a candidate cell set configured for L1/L2 mobility to a second cell, and receive, from the UE, one or more parameters related to mobility failure or mobility history or RLF associated with the mobility to assist the network node in at least one of performing a subsequent L1/L2 mobility for the UE or avoiding RLF or mobility failure during the subsequent L1/L2 mobility.

In another aspect, a method for wireless communication at a UE is provided that includes receiving, from a network node, an indication of mobility from a first cell in a candidate cell set configured for L1/L2 mobility to a second cell, and transmitting, to a network node, one or more parameters related to mobility failure or mobility history or RLF associated with the mobility to assist the network node in at least one of performing a subsequent L1/L2 mobility for the UE or avoiding RLF or mobility failure during the subsequent L1/L2 mobility.

In another aspect, a method for wireless communication at a network node is provided that includes transmitting, to a UE, a network node, an indication of mobility from a first cell in a candidate cell set configured for L1/L2 mobility to a second cell, and receiving, from the UE, one or more parameters related to mobility failure or mobility history or RLF associated with the mobility to assist the network node in at least one of performing a subsequent L1/L2 mobility for the UE or avoiding RLF or mobility failure during the subsequent L1/L2 mobility.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
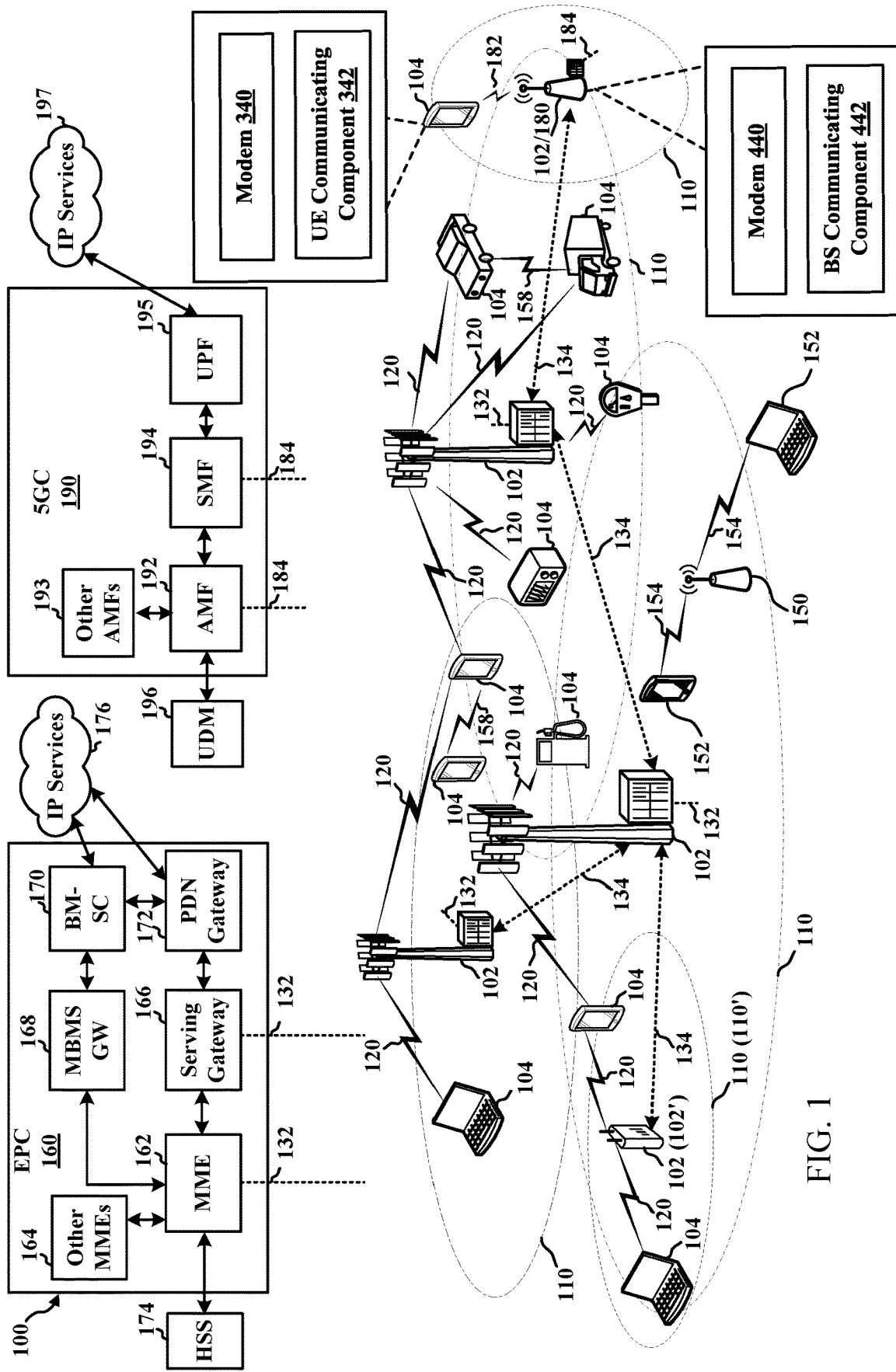
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to enhancing layer 1 (L1)/layer 2 (L2) mobility in wireless communication devices. For example, in fifth generation (5G) new radio (NR), devices (e.g., user equipment (UEs)) can perform L1/L2 mobility among cells in one or more cell groups, such as a master cell group (MCG), secondary cell group (SCG), etc., which can include performing mobility (e.g., handover) from one cell to another and/or to activate or deactivate a cell using L1 (e.g., physical (PHY) layer) signaling and/or L2 (e.g., media access control (MAC) layer) signaling. L1/L2 mobility may be performed without signaling at other layers (e.g., layer 3 (L3), which may include a radio resource control (RRC) layer). In some examples, a device can manage a list or set of candidate cells amongst which the device can perform L1/L2 mobility.

L1/L2 mobility can allow for latency reduction in performing mobility at a device. For example, some latency reduction enhancements may include configuration and maintenance for multiple candidate cells to allow fast application of configurations for candidate cells. In another example, a dynamic switch mechanism can be provided among candidate source cells for the potential applicable scenarios based on L1/L2 signaling. For example, the candidate source cells can include one or more cells in a master cell group (MCG) or secondary cell group (SCG), such as a primary cell in the MCG (PCell), a primary cell in the SCG (PSCell), which can be collectively referred to as SpCell, a secondary cell (SCell) in the MCG or SCG, etc. In some example, L1 enhancements can be provided for inter-cell beam management, including L1 measurement and reporting, and beam indication. In other examples, enhancements can include timing advance (TA) management, signaling for an interface between a centralized unit (CU) and a distributed unit (DU) to support L1/L2 mobility, if needed, etc.

In an example, the network can use RRC signaling to configure a set of cells that supports L1/L2 mobility, which can be referred to herein as a L1/L2 mobility configured cell set. The cells in the L1/L2 mobility configured cell set can have a SpCell configuration. For example, L1/L2 signaling can be used to update SpCell from the set. The L1/L2 mobility configured cell set can include one or more of a L1/L2 mobility activated cell set (e.g., a group of source cells in the configured set that are activated and can be used for data/control transfer and SpCell update by L1/L2 signaling), a L1/L2 mobility deactivated cell set (e.g., a group of source cells in the L1/L2 mobility configured set that cannot be used for data and control transmission/reception, but can be activated and used for SpCell update by L1/L2 signaling, and/or for which L1 measurement reporting is provided), and/or a candidate L1/L2 mobility cell set (e.g., a set of cells in the L1/L2 configured cell set which can be activated/updated to SpCell by the UE autonomously by L1/L2 signaling). All cells in the configured cell set that are not activated can be in the deactivated cell set. Also, the candidate L1/L2 mobility cell set can be referred to herein as the candidate cell set configured for L1/L2 mobility. This cell set can facilitate conditional L1/L2-based SpCell change as well, which can be similar to conditional handover defined in 5G NR.

In 5G NR, mobility robustness optimization (MRO) is defined for L3 mobility as part of self-organizing network (SON)/minimization of drive tests (MDT) enhancements, which can cover functionality for too early handover or PSCell change, too late handover or PSCell change, handover or PSCell change to wrong cell. Aspects described herein relate to providing MRO functions for L1/L2 mobility, such as (but not limited to) optimizing L1/L2 mobility activated cell set, candidate cell set, and configured cell set, optimizing the timing information (e.g., delay between reception of PCell switch command during L1/L2 mobility and successful PCell access), optimizing the probability of accessing/changing the PCell after receiving the switching command, avoiding ping-pong handovers between L3 and L1/L2 mobility and identifying best handover strategy at next generation (NG)-radio access network (RAN), etc.

For example, a device can report L1/L2 mobility failure information to the NG-RAN to allow the NG-RAN to more effectively handle mobility in such cases. In another example, L1/L2 mobility-related statistics can be collected and used at the NG-RAN in performing mobility. In yet another example, mobility history can be used to improve L1/L2 mobility awareness. In another example, multi-SCG configurations can be optimized to improve mobility. For example, such functionalities can allow for effectively handling certain mobility scenarios, such as too late L1/L2 mobility, too early L1/L2 mobility, L1/L2 mobility to wrong cell, L3 handover failure, PCell switch failure, etc., as described further herein.

Such optimizations for L1/L2 mobility can provide for a better mobility performance, reduce resource utilization as compared to scenarios where mobility performance is not improved, etc. This can improve device functionality in 5G NR, providing an improved user experience.

The described features will be presented in more detail below with reference to FIGS. 1-11.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for transmitting one or more parameters related to mobility failure to improve L1/L2 mobility, in accordance with aspects described herein. In addition, some nodes may have a modem 440 and BS communicating component 442 for receiving one or more parameters related to mobility failure to improve L1/L2 mobility, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MB SFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, UE communicating component 342 can receive an indication of mobility from a first cell to a second cell, where one or more of the cells can be in a candidate cell set configured for L1/L2 mobility. UE communicating component 342 can transmit one or more parameters related to mobility failure, mobility history, or radio link failure (RLF) to improve subsequent L1/L2 mobility. For example, the BS communicating component 442 can transmit the indication of mobility to the UE 104 and can receive the one or more parameters for the UE 104. In an example, BS communicating component 442 can transmit an indication of a subsequent L1/L2 mobility based on the one or more parameters to improve mobility at the UE 104 and/or other UEs. In another example, UE communicating component 342 can inform a NG-RAN (e.g., one or more components of a EPC 160 or 5GC 190 via base station 102) of which conditional primary secondary cell (PSCell) change (CPC) configurations are kept or released in a successful PSCell change report or failure report. In this example, the BS communicating component 442 can use this information for subsequent CPC.

Figure 2:
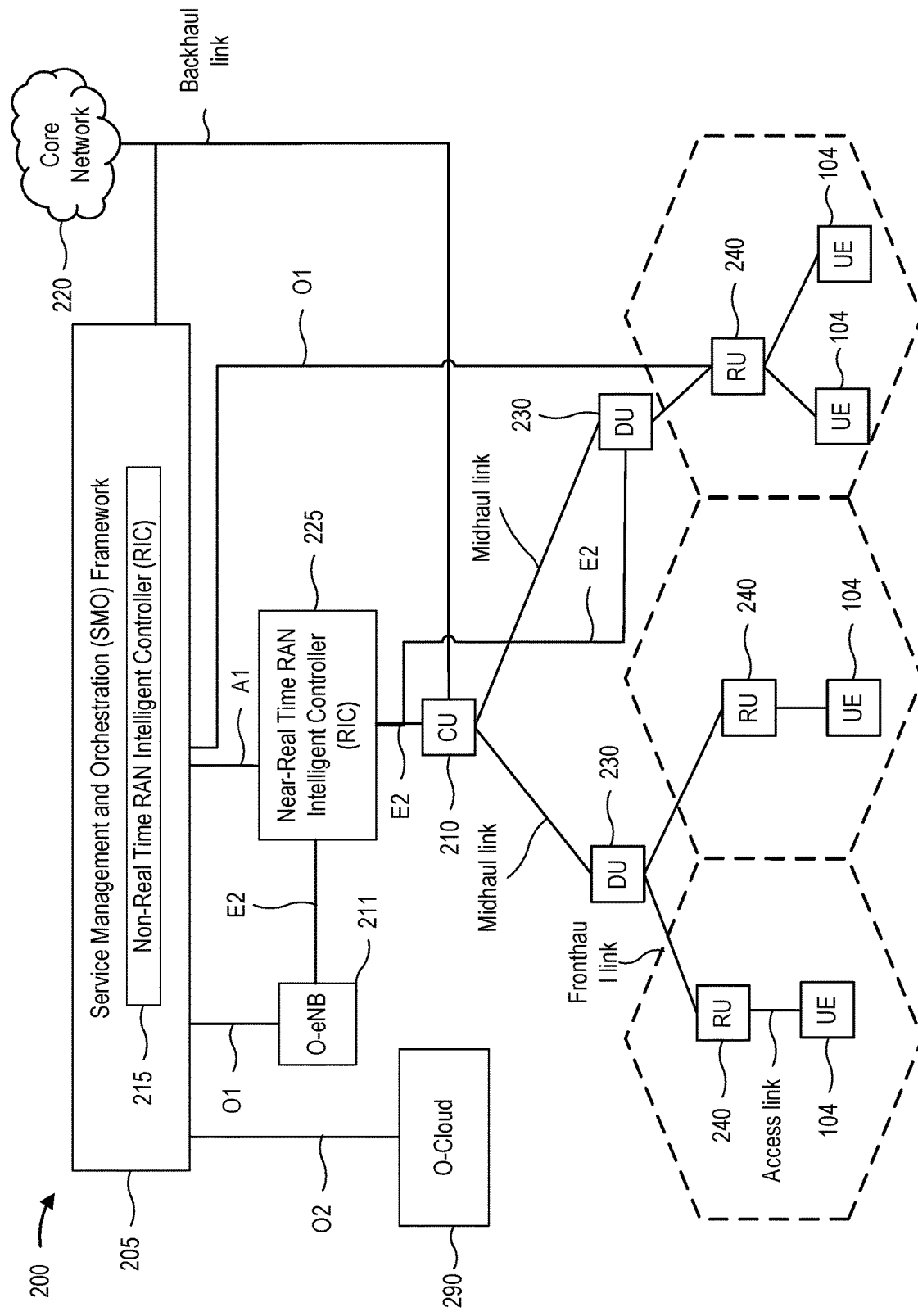
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit—User Plane (CU-UP)), control plane functionality (i.e., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT MC 225. The Non-RT MC 215 may be coupled to or communicate with (such as via an A1 interface) the Near-RT MC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In an example, BS communicating component 442, as described herein, can be at least partially implemented within a CU 210 and/or one or more DUs 230 to transmit an indication of mobility to a UE 104, receive one or more parameters from the UE 104 related to mobility failure, mobility history, RLF, etc., to improve subsequent L1/L2 mobility, etc. In another example, BS communicating component 442, as described herein, can be at least partially implemented within one or more RUs 240 to transmit an indication of mobility to a UE 104, receive one or more parameters from the UE 104 related to mobility failure, mobility history, RLF, etc., to improve subsequent L1/L2 mobility, etc.

Turning now to FIGS. 3-11, aspects are depicted with reference to one or more components and one or more methods that may perform the actions or operations described herein, where aspects in dashed line may be optional. Although the operations described below in FIGS. 5, 6, and 8-10 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 3:
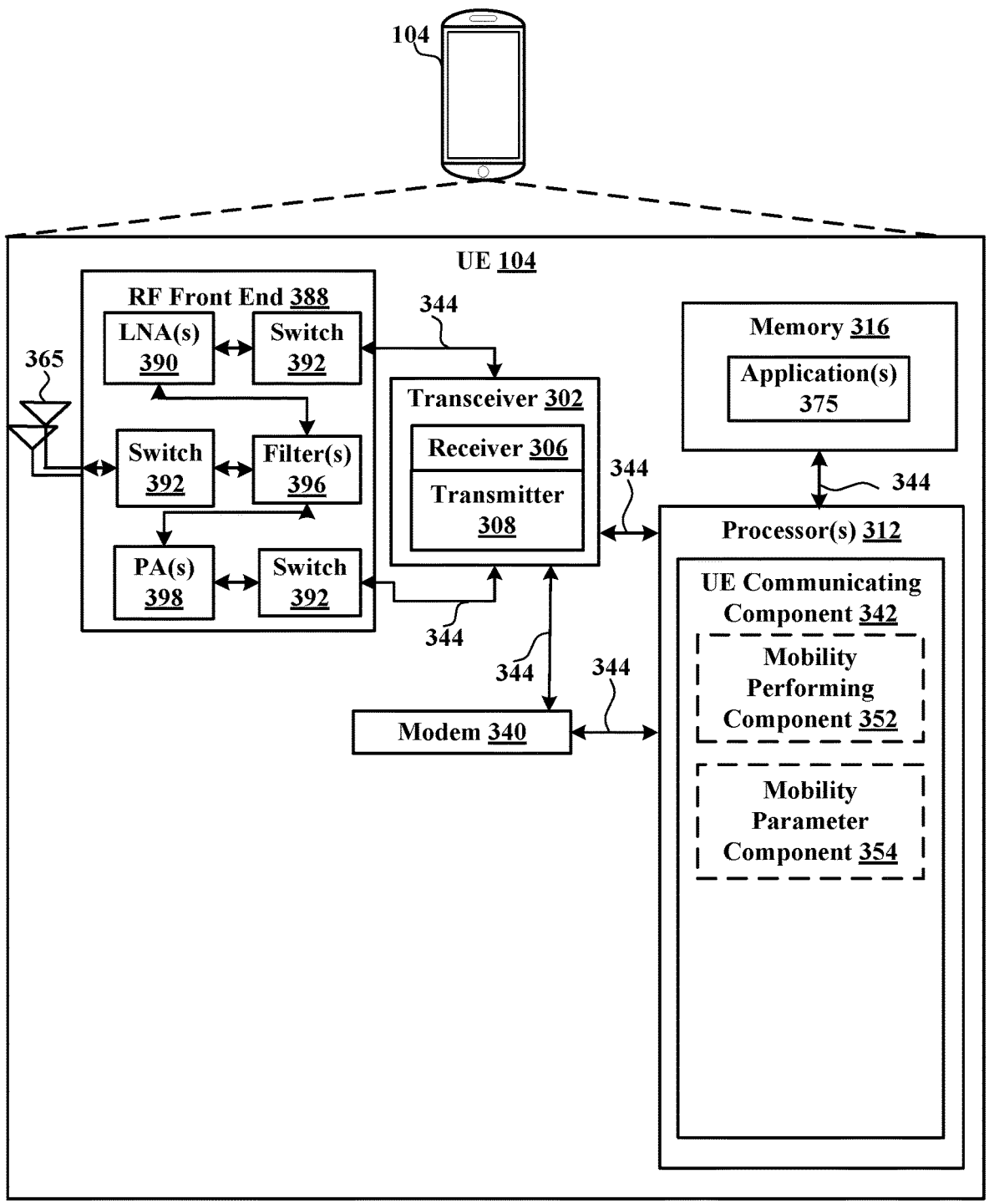
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or UE communicating component 342 for transmitting one or more parameters related to mobility failure to improve L1/L2 mobility, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory 316 may be configured to store data used herein and/or local versions of applications 375 or UE communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a mobility performing component 352 for performing mobility between a first cell and a second cell, and/or a mobility parameter component 354 for generating and/or transmitting one or more parameters related to mobility failure, mobility history, RLF, etc. to improve a subsequent L1/L2 mobility, in accordance with aspects described herein.

In an aspect, the processor(s) 312 may correspond to one or more of the processors described in connection with the UE in FIG. 11. Similarly, the memory 316 may correspond to the memory described in connection with the UE in FIG. 11.

Figure 4:
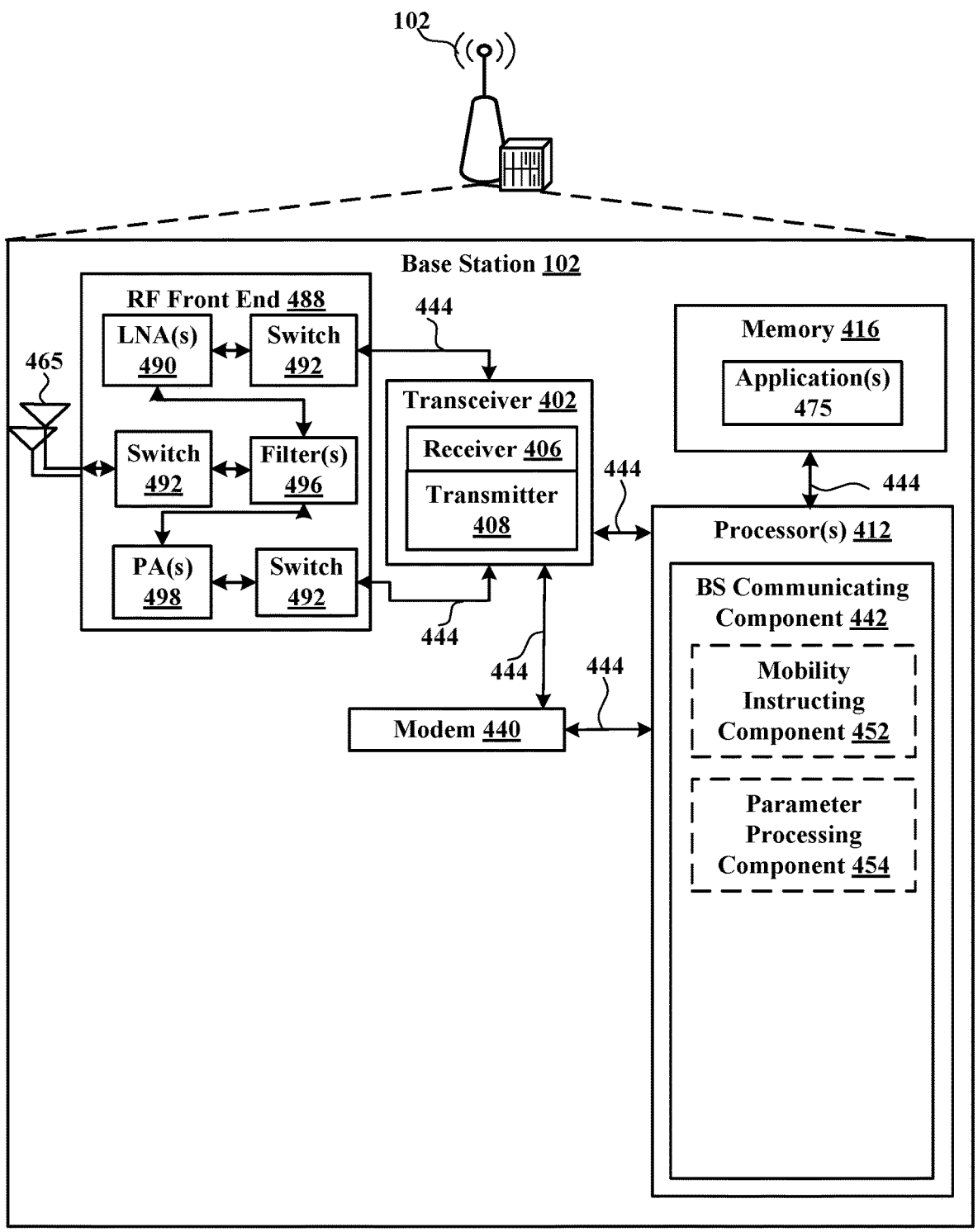
FIG. 4 is a block diagram illustrating an example of a base station, in accordance with various aspects of the present disclosure.

Referring to FIG. 4, one example of an implementation of base station 102 (e.g., a base station 102 and/or gNB 180, as described above) may include a variety of components, some of which have already been described above, but including components such as one or more processors 412 and memory 416 and transceiver 402 in communication via one or more buses 444, which may operate in conjunction with modem 440 and BS communicating component 442 for receiving one or more parameters related to mobility failure to improve L1/L2 mobility, in accordance with aspects described herein.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include a mobility instructing component 452 for instructing a device (e.g., a UE) to perform mobility between a first cell and a second cell, and/or a mobility parameter component 354 for receiving and/or processing one or more parameters related to mobility failure, mobility history, RLF, etc. to improve a subsequent L1/L2 mobility, in accordance with aspects described herein.

In an aspect, the processor(s) 412 may correspond to one or more of the processors described in connection with the base station in FIG. 11. Similarly, the memory 416 may correspond to the memory described in connection with the base station in FIG. 11.

Figure 5:
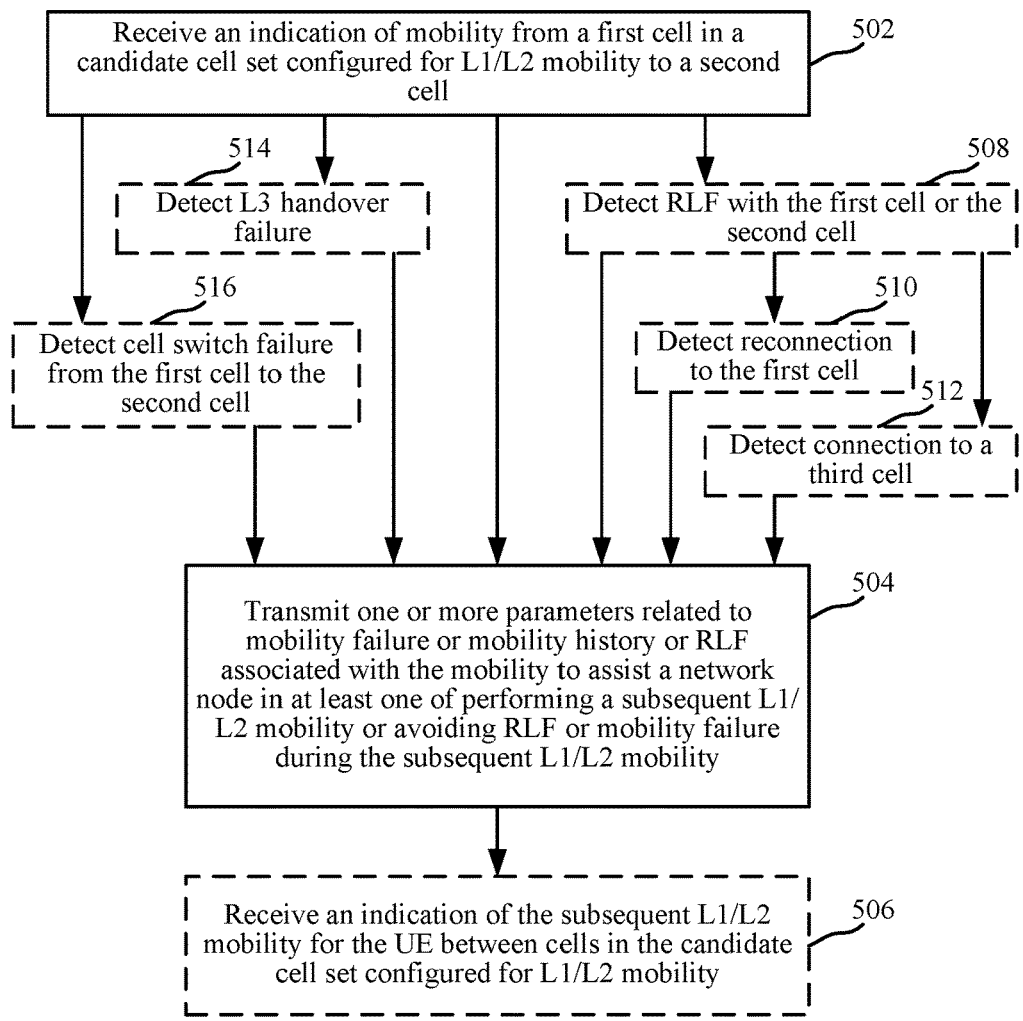
FIG. 5 is a flow chart illustrating an example of a method for transmitting one or more parameters related to mobility failure to improve layer 1 (L1)/layer 2 (L2) mobility, in accordance with aspects described herein.
Figure 6:
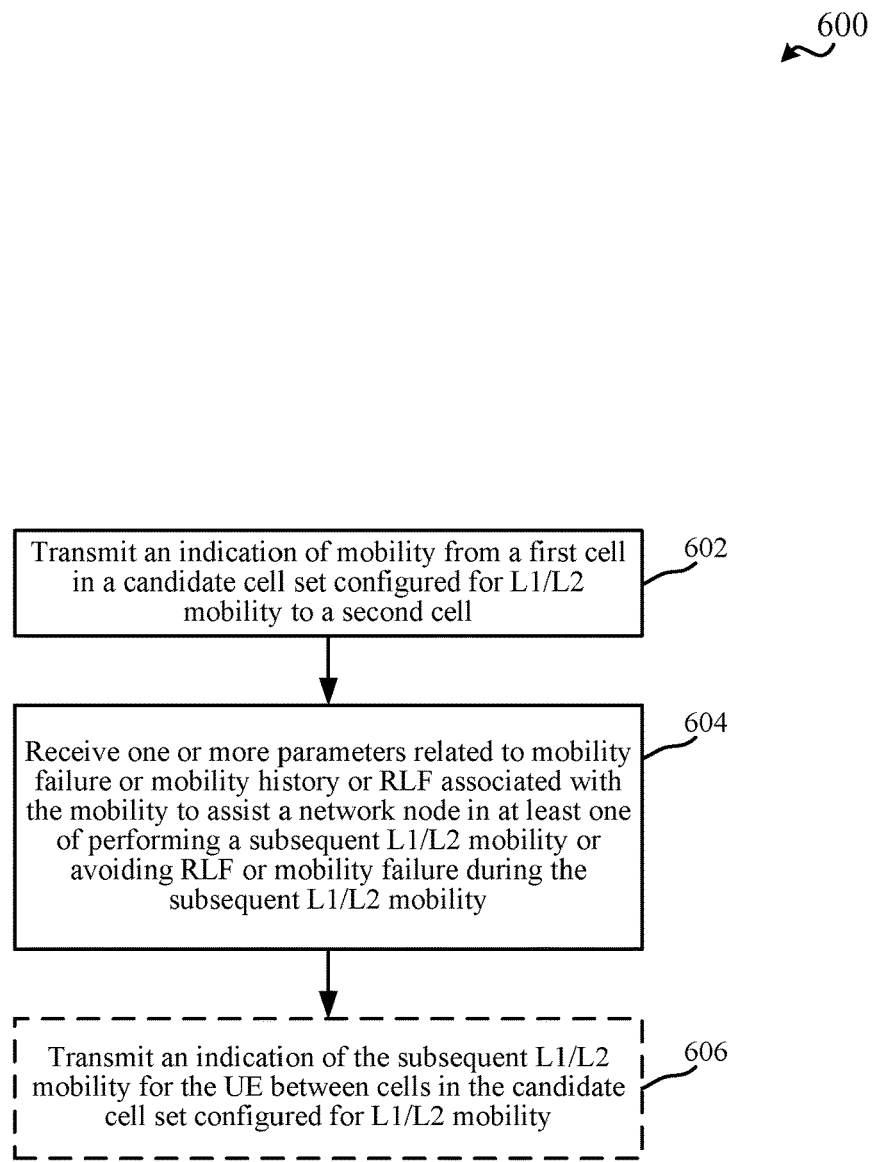
FIG. 6 is a flow chart illustrating an example of a method for receiving one or more parameters related to mobility failure to improve L1/L2 mobility, in accordance with aspects described herein.

FIG. 5 illustrates a flow chart of an example of a method 500 for transmitting one or more parameters related to mobility failure to improve L1/L2 mobility, in accordance with aspects described herein. FIG. 6 illustrates a flow chart of an example of a method 600 for receiving one or more parameters related to mobility failure to improve L1/L2 mobility, in accordance with aspects described herein. In an example, a UE 104 can perform the functions described in method 500 using one or more of the components described in FIGS. 1 and 3. In an example, a base station 102 (e.g., a gNB, a monolithic base station, a portion of a disaggregated base station, etc.) can perform the functions described in method 600 using one or more of the components described in FIGS. 1 and 4. Methods 500 and 600 are described in conjunction with one another for ease of explanation; however, the methods 500 and 600 are not required to be performed together and indeed can be performed independently using separate devices.

In an example, a UE 104 can be configured (e.g., by a base station 102 or other network node) with a L1/L2 mobility configured cell set of multiple cells that support L1/L2 mobility and with which the UE 104 can communicate and/or to which the UE 104 can perform L1/L2 mobility. For example, the L1/L2 mobility configured cell set can include candidate cells for performing L1/L2 mobility as PCells, PSCells, SCells, etc. in MCG, SCG, etc. In addition, for example, the UE 104 can be configured (e.g., by a base station 102 or other network node) with a candidate cell set configured for L1/L2 mobility, which can be a subset of the L1/L2 mobility configured cell set that is activated for communications for the UE 104. An example is shown in FIG. 7.

Figure 7:
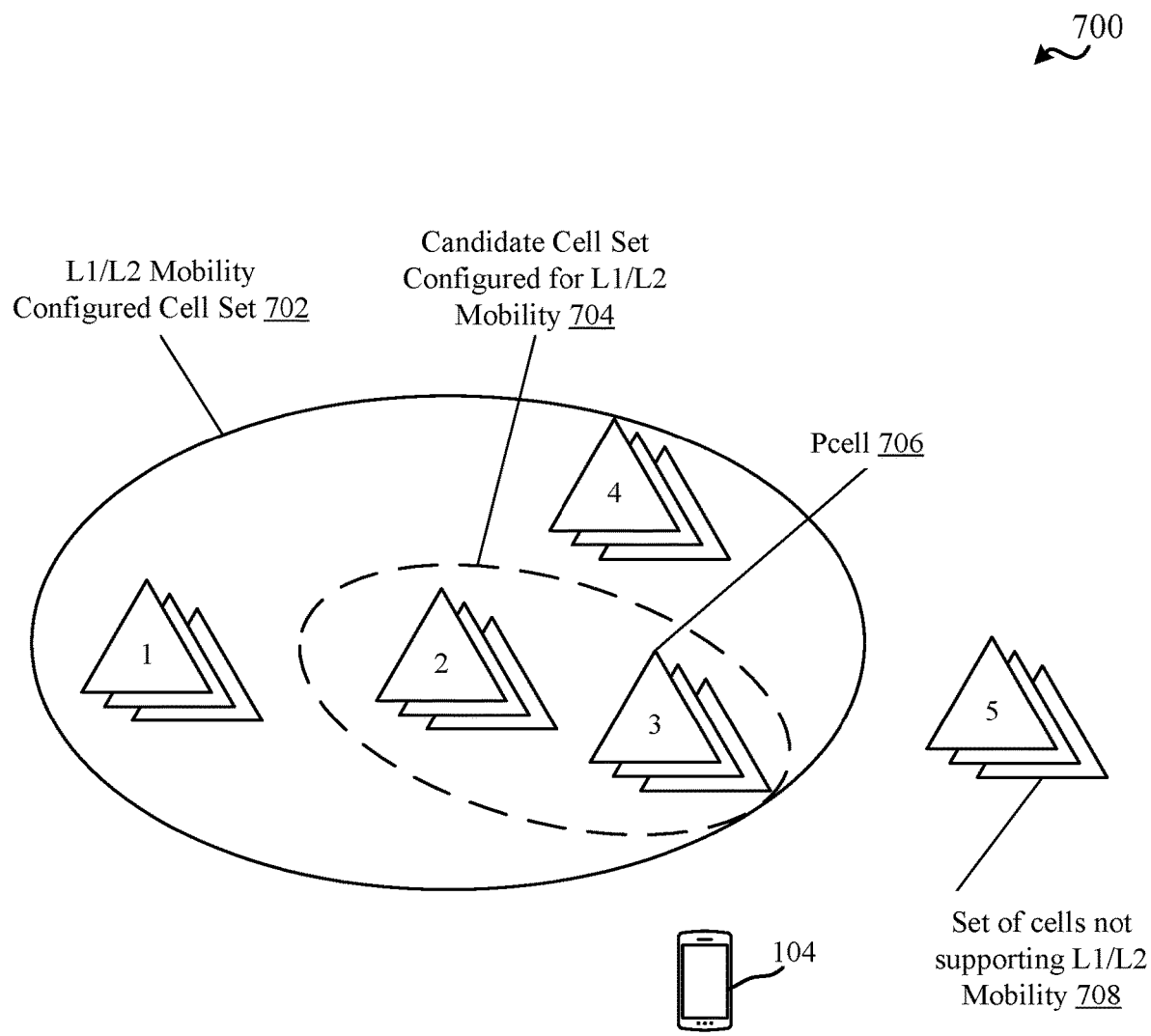
FIG. 7 illustrates an example of a wireless communication system including various cell sets, in accordance with aspects described herein.

FIG. 7 illustrates an example of a wireless communication system 700 including various cell sets. Wireless communication system 700 can include a UE 104 configured with a L1/L2 mobility configured cell set 702 that includes cells 1, 2, 3, and 4. For example, the UE 104 can be configured with the L1/L2 mobility configured cell set 702 via RRC signaling from a network node (e.g., base station 102) or other suitable configuration signaling (e.g., media access control (MAC)-control element (CE), downlink control information (DCI), etc.). The UE 104 can also be configured with a candidate cell set configured for L1/L2 mobility 704 (also referred to herein as an L1/L2 mobility activated cell set), which is a subset of the L1/L2 mobility configured cell set 702 of source cells that are activated for communication with UE 104. In this example, the candidate cell set configured for L1/L2 mobility 704 can include cell 3, which is the PCell 706, and cell 2. Wireless communication system 700 can also include a set of cells not supporting L1/L2 mobility 708, which can include cell 5. For example, the UE 104 can perform L1/L2 mobility to communicate with a target cell in the L1/L2 mobility configured cell set 702 that is not currently in the candidate cell set configured for L1/L2 mobility 704—e.g., cell 1 or 4. Once the UE 104 performs mobility to the target cell, the target cell can be in the candidate cell set configured for L1/L2 mobility 704. For example, the target cell can be added and/or mobility can be from a source cell to a target cell, such that the target cell can replace a source cell in the candidate cell set configured for L1/L2 mobility 704.

In method 600, at Block 602, an indication of mobility from a first cell in a candidate cell set configured for L1/L2 mobility to a second cell can be transmitted. In an aspect, mobility instructing component 452, e.g., in conjunction with processor(s) 412, memory 416, transceiver 402, BS communicating component 442, etc., can transmit (e.g., to a UE 104) the indication of mobility from the first cell in the candidate cell set configured for L1/L2 mobility to the second cell. For example, mobility instructing component 452 can transmit L1/L2 signaling to cause the UE 104 to add the second cell to the candidate cell set configured for L1/L2 mobility 704 and/or to replace the first cell with the second cell in the set. In another example, mobility instructing component 452 can transmit a handover command (e.g., via RRC signaling) for the UE 104 to perform handover from the first cell to the second cell. At least the first cell can be in the candidate cell set configured for L1/L2 mobility.

In method 500, at Block 502, an indication of mobility from a first cell in a candidate cell set configured for L1/L2 mobility to a second cell can be received. In an aspect, mobility performing component 352, e.g., in conjunction with processor(s) 312, memory 316, transceiver 302, UE communicating component 342, etc., can receive (e.g., from a network node) the indication of mobility from the first cell in the candidate cell set configured for L1/L2 mobility to the second cell. As described, UE 104 can be communicating with the first cell as part of the first cell being in the candidate cell set configured for L1/L2 mobility. Mobility performing component 352 can receive the indication of mobility as L1/L2 signaling to add the second cell to the candidate cell set configured for L1/L2 mobility (and/or to replace the first cell in the set), as RRC signaling to handover from the first cell to the second cell, etc. Mobility performing component 352 can accordingly perform the mobility from the first cell to the second cell, whether L1/L2 mobility or L3 mobility (e.g., L3 handover).

In method 500, at Block 504, one or more parameters related to mobility failure or mobility history or RLF associated with the mobility can be transmitted to assist a network node in at least one of performing a subsequent L1/L2 mobility or avoiding RLF or mobility failure during the subsequent L1/L2 mobility. In an aspect, mobility parameter component 354, e.g., in conjunction with processor(s) 312, memory 316, transceiver 302, UE communicating component 342, etc., can transmit (e.g., to the network node) the one or more parameters related to mobility failure or mobility history or RLF associated with the mobility to assist a network node in at least one of performing a subsequent L1/L2 mobility or avoiding RLF or mobility failure during the subsequent L1/L2 mobility. For example, mobility parameter component 354 may detect mobility failure or RLF during the mobility performed from the first cell to the second cell, as described further herein, and may transmit the one or more parameters based on detecting the mobility failure or RLF. For example, the one or more parameters may include various types of information that can assist the network node in the subsequent L1/L2 mobility, such as an indication related to whether the mobility was too late, too early, to the wrong PCell, resulted in L3 handover failure, resulted in PCell switch failure, etc., as described in the scenarios above and further herein. In another example, the one or more parameters may include mobility history indications that may not be related to mobility failure or RLF, such as whether cell changes are due to L3 or L1/L2 mobility.

In method 600, at Block 604, one or more parameters related to mobility failure or mobility history or RLF associated with the mobility can be received to assist a network node in at least one of performing a subsequent L1/L2 mobility or avoiding RLF or mobility failure during the subsequent L1/L2 mobility. In an aspect, parameter processing component 454, e.g., in conjunction with processor(s) 412, memory 416, transceiver 402, BS communicating component 442, etc., can receive (e.g., from a UE 104) the one or more parameters related to mobility failure or mobility history or RLF associated with the mobility to assist the network node (e.g., base station 102) in at least one of performing a subsequent L1/L2 mobility or avoiding RLF or mobility failure during the subsequent L1/L2 mobility.

In method 600, optionally at Block 606, an indication of the subsequent L1/L2 mobility for the UE between cells in the candidate cell set configured for L1/L2 mobility can be transmitted. In an aspect, mobility instructing component 452, e.g., in conjunction with processor(s) 412, memory 416, transceiver 402, BS communicating component 442, etc., can transmit the indication of the subsequent L1/L2 mobility for the UE between the cells in the candidate cell set configured for L1/L2 mobility. For example, mobility instructing component 452 can generate the indication of the subsequent L1/L2 mobility based on the one or more parameters received at Block 604, which can include avoiding mobility between certain cells, modifying the L1/L2 mobility configured cell set, modifying the candidate cell set configured for L1/L2 mobility, modifying timing information (e.g., delay between reception of mobility indication during L1/L2 mobility and successful cell access), modifying probability of accessing or changing the cell after receiving the mobility indication, avoiding ping-pong handovers between L3 and L1/L2 mobility, etc.

In method 500, optionally at Block 506, an indication of the subsequent L1/L2 mobility for the UE between cells in the candidate cell set configured for L1/L2 mobility can be received. In an aspect, mobility performing component 352, e.g., in conjunction with processor(s) 312, memory 316, transceiver 302, UE communicating component 342, etc., can receive the indication of the subsequent L1/L2 mobility for the UE between cells in the candidate cell set configured for L1/L2 mobility, which can be optimized based on the one or more parameters transmitted at Block 504.

In one example, in method 500, optionally at Block 508, RLF can be detected with the first cell or the second cell. In an aspect, mobility performing component 352, e.g., in conjunction with processor(s) 312, memory 316, transceiver 302, UE communicating component 342, etc., can detect RLF with the first cell or the second cell, and mobility parameter component 354 can transmit the one or more parameters based on detecting RLF with the first cell or the second cell. For example, referring to FIG. 7, the mobility indication received at Block 502 can be a L1/L2 mobility indication (e.g., MAC-CE or DCI) to perform a PCell switch from PCell 3 706 to a second cell in the L1/L2 mobility configured cell set 702 or the candidate cell set configured for L1/L2 mobility 704. Before the mobility is performed or completed from PCell 3 706, however, mobility performing component 352 can detect RLF at the PCell 3 706, which can indicate too late L1/L2 mobility. In this example, mobility parameter component 354 can transmit the one or more parameters to the network node including an indicator of whether the UE 104 received the mobility indication (e.g., L1/L2 mobility switch command) before the RLF. In one example, mobility parameter component 354 can transmit the indicator in a RLF report transmitted to the network node based on detecting the RLF. Parameter processing component 454 can receive the RLF report, in this example, and can improve subsequent L1/L2 mobility from PCell 3 706 and avoid potential radio link failures in the future based on the indicator.

In another example, in method 500, after detecting RLF with the second cell at Block 508, optionally at Block 510, reconnection to the first cell can be detected. In an aspect, mobility performing component 352, e.g., in conjunction with processor(s) 312, memory 316, transceiver 302, UE communicating component 342, etc., can detect RLF with the second cell followed by reconnection to the first cell, and mobility parameter component 354 can transmit the one or more parameters based on detecting RLF with the second cell (e.g., within a configured period of time after mobility to the second cell) and reconnection to the first cell (e.g., within a configured period of time after RLF with the second cell), which can indicate too early L1/L2 mobility. For example, referring to FIG. 7, the mobility indication received at Block 502 can be a mobility indication (e.g., L1/L2 or L3) to perform a PCell switch from PCell 3 706 to a second cell, such as cell 2. After the UE 104 performs mobility from the PCell 3 706 to cell 2, however, mobility performing component 352 can detect RLF at cell 2 within a period of time and an associated reconnection to the PCell 3 706. In this example, mobility parameter component 354 can transmit the one or more parameters to the network node including a value indicating a duration of a time difference between reception of the mobility indication (e.g., L1/L2 mobility switch command) to RLF, or a time difference between mobility execution to the RLF. In one example, mobility parameter component 354 can transmit the indicator in a RLF report transmitted to the network node based on detecting the RLF. In addition, in this example, mobility parameter component 354 can transmit the one or more parameters to the network node including an indicator of whether the last mobility performed before the RLF was L1/L2 or L3 mobility. In either case, in this example, parameter processing component 454 can receive the RLF report, and can improve subsequent L1/L2 mobility from PCell 3 706 based on the time duration value or the indicator of mobility type.

In another example, in method 500, after detecting RLF with the second cell at Block 508, optionally at Block 512, reconnection to a third cell can be detected. In an aspect, mobility performing component 352, e.g., in conjunction with processor(s) 312, memory 316, transceiver 302, UE communicating component 342, etc., can detect RLF with the second cell followed by connection to the third cell, and mobility parameter component 354 can transmit the one or more parameters based on detecting RLF with the second cell (e.g., within a configured period of time after mobility to the second cell) and connection to the third cell (e.g., within a configured period of time after RLF with the second cell), which can indicate L1/L2 mobility to the wrong PCell. For example, referring to FIG. 7, the mobility indication received at Block 502 can be a mobility indication (e.g., L1/L2 or L3) to perform a PCell switch from PCell 3 706 to a second cell, such as cell 2. After the UE 104 performs mobility from the PCell 3 706 to cell 2, however, mobility performing component 352 can detect RLF at cell 2 within a period of time and an associated connection to a third cell, such as cell 4. In this example, mobility parameter component 354 can transmit the one or more parameters to the network node including a L1/L2 measurements from cells within the L1/L2 mobility configured cell set 702. In one example, mobility parameter component 354 can transmit the L1/L2 measurements in a RLF report transmitted to the network node based on detecting the RLF. For example, the L1/L2 measurements can include measurements of reference signals received from the cells at the UE 104, such as channel state information reference signals (CSI-RS), cell-specific reference signals (CRS), synchronization signal block (SSB) signals, etc. In this example, parameter processing component 454 can receive the RLF report, and can improve subsequent L1/L2 mobility from PCell 3 706 based on the L1/L2 measurements of the cells in the L1/L2 mobility configured cell set 702.

In one example, in method 500, optionally at Block 514, L3 handover failure can be detected. In an aspect, mobility performing component 352, e.g., in conjunction with processor(s) 312, memory 316, transceiver 302, UE communicating component 342, etc., can detect L3 handover failure, and mobility parameter component 354 can transmit the one or more parameters based on detecting the L3 handover failure. For example, referring to FIG. 7, the mobility indication received at Block 502 can be a L3 mobility indication to perform L3 handover to a PCell outside of the L1/L2 mobility configured cell set 702, such L3 handover from PCell 3 706 to cell 5. Handover failure can be detected before or during handover to cell 5, which may include a RLF. In this example, mobility parameter component 354 can transmit the one or more parameters to the network node including an indicator of whether the PCell 3 706 from which the mobility is performed and/or the PCell to which the mobility is performed, cell 5, or any previous, failed, reestablished, or reconnected PCell is part of the L1/L2 mobility configured cell set 702. In one example, mobility parameter component 354 can transmit the indicator in a RLF report transmitted to the network node based on detecting the L3 handover failure. In another example, based on detecting L3 handover failure, mobility parameter component 354 can transmit the one or more parameters to the network node including one or more of radio resource management (RRM) measurements whether a neighbor cell is part of the L1/L2 configured cell set 702, RRM measurements whether a neighbor cell is part of the candidate cell set configured for L1/L2 mobility 704, etc. In another example, based on detecting L3 handover failure, mobility parameter component 354 can transmit the one or more parameters to the network node including an indication of the L1/L2 configured cell set 702, an indication of the candidate cell set configured for L1/L2 mobility 704, etc. In this example, parameter processing component 454 can receive the RLF report, the RRM measurements the indication of the L1/L2 configured cell set 702, or the indication of the candidate cell set configured for L1/L2 mobility 704, and can accordingly improve subsequent L1/L2 mobility from PCell 3 706.

In one example, in method 500, optionally at Block 516, cell switch failure from the first cell to the second cell can be detected. In an aspect, mobility performing component 352, e.g., in conjunction with processor(s) 312, memory 316, transceiver 302, UE communicating component 342, etc., can detect cell switch failure from the first cell to the second cell, and mobility parameter component 354 can transmit the one or more parameters based on detecting the cell switch failure. For example, referring to FIG. 7, the mobility indication received at Block 502 can be a mobility indication (cell switch command) to perform a PCell switch from PCell 3 706 to another cell, such as cell 2. Cell switch failure can be detected before or during handover to cell 2, which may include detecting a negative acknowledgement (NACK) feedback for DCI or MAC-CE failure in cell 2. In this example, mobility parameter component 354 can transmit the one or more parameters to the network node including, or that can be used for the network node to compute, statistics on L1/L2 mobility. For example, the statistics may include a percentage of successful cell switches for a given cell (e.g., PCell 3 706), between two cells (e.g., between PCell 3 706 and cell 2), or for cells within the candidate cell set configured for L1/L2 mobility 704, etc. In one example, mobility parameter component 354 can transmit the statistics in any case (e.g., not just when cell switch failure is detected), or when cell switch failure is detected. In this example, parameter processing component 454 can receive or compute the statistics, and can use the statistics to accordingly improve subsequent L1/L2 mobility from PCell 3 706 (e.g., to prefer mobility to certain cells having at least a threshold success percentage for mobility from PCell 3 706, avoid mobility to certain cells having a success percentage for mobility from PCell 3 706 that is below a threshold, etc.).

In an example, enabling L1/L2 mobility between cells may cause ping-pong handovers between L3 and L1/L2 mobility. For example, ping-pong handovers can refer to a threshold number of handovers occurring within a short period of time, which can be undesirable. L3 handover can have parameters to avoid such handovers, but L1/L2 mobility of a UE 104 may cause the UE 104 to handover without consideration of the L3 handover parameters. In this example, the one or more parameters transmitted at Block 504 may include an indicator for entries in a mobility history report (MHR) of whether a SpCell change is due to L3 mobility or due to L1/L2 mobility. In another example, the one or more parameters can include UE history information (UHI), and the network node receiving the UHI can include an indicator for entries in the UHI indicating whether the SpCell change is due to L3 mobility or due to L1/L2 mobility. In any case, parameter processing component 454 can process the MHR or UHI and associated indicators to improve L1/L2 mobility, such as by avoiding L1/L2 mobility to a cell within a threshold period of time after L3 mobility from that cell.

Figure 8:
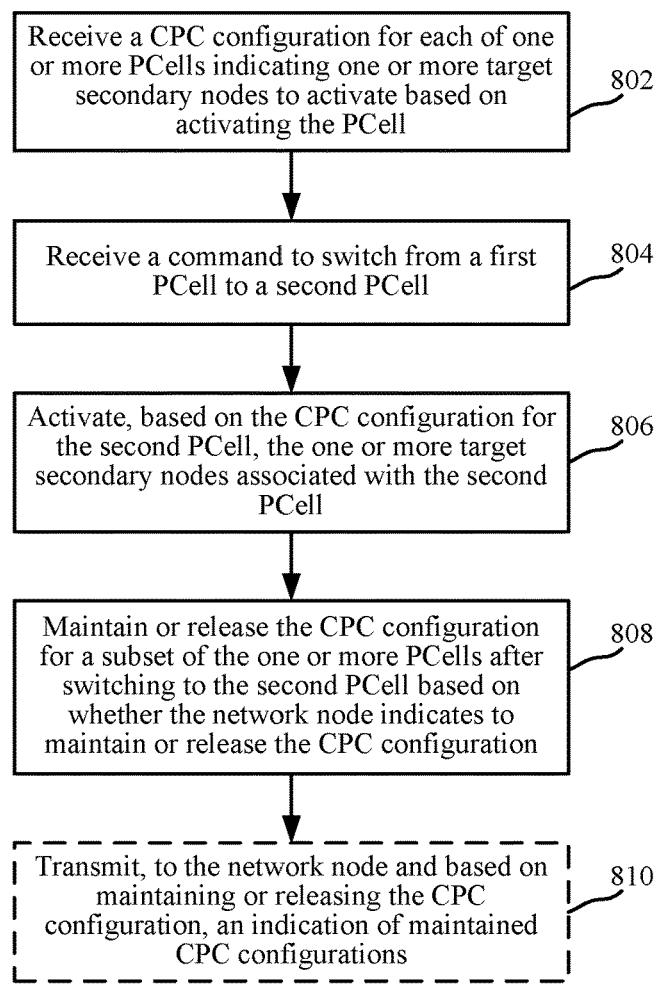
FIG. 8 is a flow chart illustrating an example of a method for managing a conditional primary secondary cell (PSCell) change (CPC) configuration, in accordance with aspects described herein.
Figure 9:
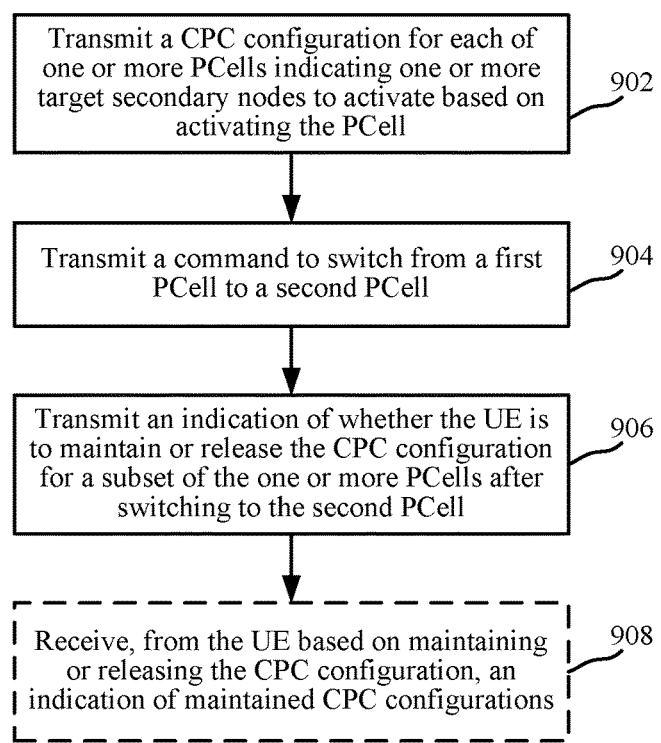
FIG. 9 is a flow chart illustrating an example of a method for configuring CPC configurations, in accordance with aspects described herein.

FIG. 8 illustrates a flow chart of an example of a method 800 for managing a CPC configuration, in accordance with aspects described herein. FIG. 9 illustrates a flow chart of an example of a method 900 for configuring CPC configurations, in accordance with aspects described herein. In an example, a UE 104 can perform the functions described in method 800 using one or more of the components described in FIGS. 1 and 3. In an example, a base station 102 (e.g., a gNB, a monolithic base station, a portion of a disaggregated base station, etc.) can perform the functions described in method 900 using one or more of the components described in FIGS. 1 and 4. Methods 800 and 900 are described in conjunction with one another for ease of explanation; however, the methods 800 and 900 are not required to be performed together and indeed can be performed independently using separate devices.

In method 900, at Block 902, a CPC configuration for each of one or more PCells indicating one or more target secondary nodes to activate based on activating the PCell can be transmitted. In an aspect, mobility instructing component 452, e.g., in conjunction with processor(s) 412, memory 416, transceiver 402, BS communicating component 442, etc., can transmit (e.g., to a UE 104) the CPC configuration for each of one or more PCells indicating one or more target secondary nodes to activate based on activating the PCell. An example is shown in FIG. 10.

Figure 10:
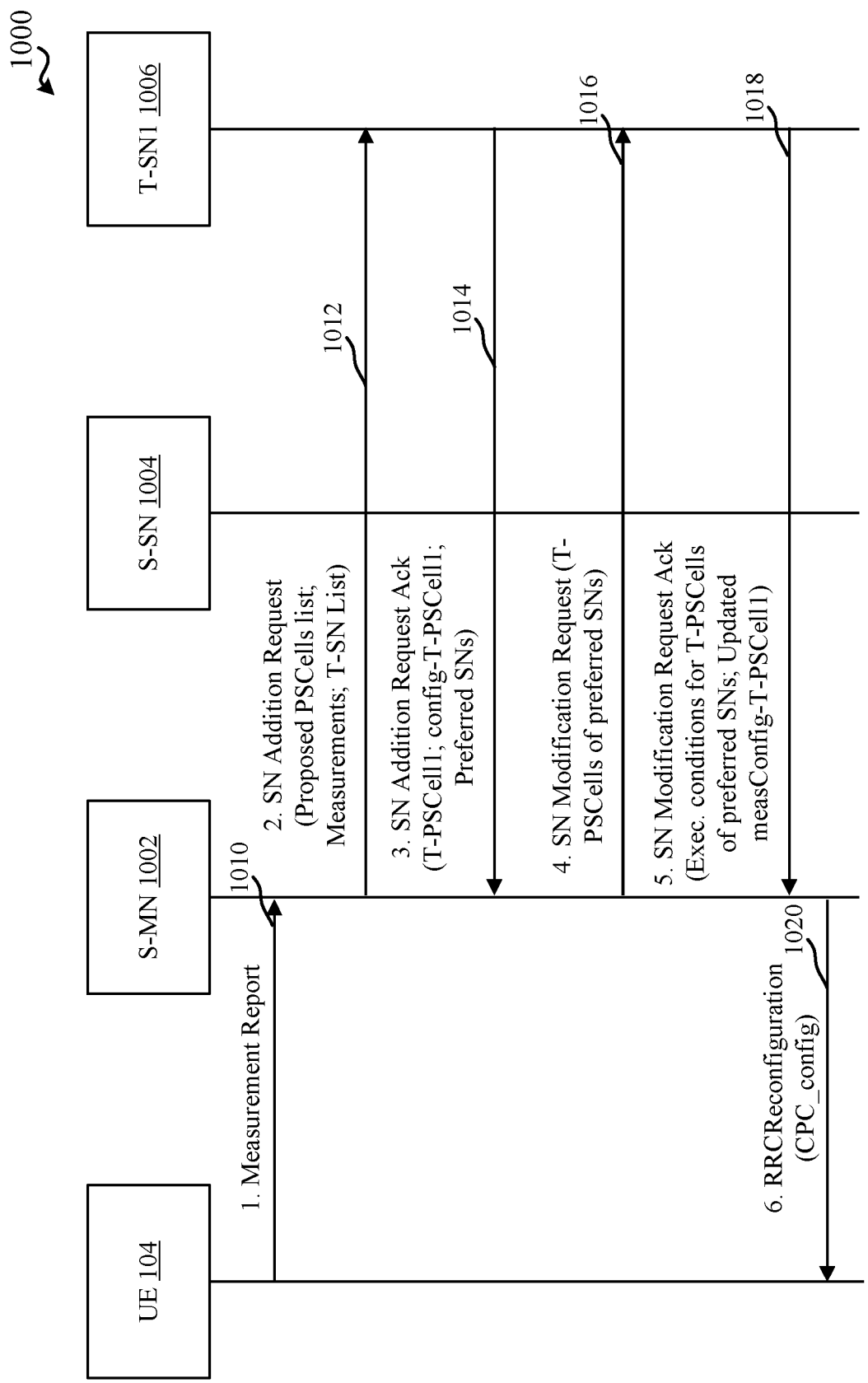
FIG. 10 illustrates an example of a wireless communication system for configuring a CPC configuration in multi-secondary cell group (SCG) configurations, in accordance with aspects described herein.

FIG. 10 illustrates an example of a wireless communication system 1000 for configuring a CPC configuration in multi-SCG configurations. Wireless communication system 1000 can include a UE 104, source master node (S-MN) 1002, source secondary node (S-SN) 1004, and one or more target secondary nodes (T-SN1) 1006. UE 104 can communicate with S-MN 1002 and S-SN 1004, and can transmit a measurement report to the S-MN 1002 at 1010. The measurement report can include signal measurements of one or more cells or related nodes, such as T-SN1 1006, as measured by the UE 104. Based on the measurement report, for example, S-MN 1002 can send a SN addition request to T-SN1 1006 with a proposed list of PSCells, measurements at 1012, and T-SN list, and T-SN1 1006 can send a SN addition request acknowledgement with a target PSCell (T-PSCell) indication and/or configuration, and a list of preferred SNs at 1014. In another example, S-MN 1002 can send a SN modification request to T-SN1 1006 with a list of T-PSCells of the preferred SNs at 1016, and T-SN1 1006 can send a SN modification request acknowledgement with execution conditions for the T-PSCells of the preferred SNs, and an updated measurement configuration for the T-PSCell at 1018. The S-MN 1002 can transmit a RRCReconfiguration command to the UE 104 indicating a CPC_config based on the execution conditions for the T-PSCells and/or the updated measurement configuration for the T-PSCells at 1020.

In method 800, at Block 802, a CPC configuration for each of one or more PCells indicating one or more target secondary nodes to activate based on activating the PCell can be received. In an aspect, mobility performing component 352, e.g., in conjunction with processor(s) 312, memory 316, transceiver 302, UE communicating component 342, etc., can receive (e.g., from a network node) the CPC configuration for each of one or more PCells indicating one or more target secondary nodes to activate based on activating the PCell. As described, mobility performing component 352 can receive the CPC configuration in RRC signaling from the network node (e.g., from S-MN 1002).

In method 900, at Block 904, a command to switch from a first PCell to a second PCell can be transmitted. In an aspect, mobility instructing component 452, e.g., in conjunction with processor(s) 412, memory 416, transceiver 402, BS communicating component 442, etc., can transmit (e.g., to a UE 104) the command to switch from the first PCell to the second PCell. For example, mobility instructing component 452 can transmit the command to the UE 104 based on a measurement report received from the UE 104 and/or in RRC signaling.

In method 800, at Block 804, a command to switch from the first PCell to the second PCell can be received. In an aspect, mobility performing component 352, e.g., in conjunction with processor(s) 312, memory 316, transceiver 302, UE communicating component 342, etc., can receive (e.g., from the network node) the command to switch from the first PCell to the second PCell. Mobility performing component 352 can accordingly switch from the first PCell to the second PCell (e.g., using L1/L2 or L3 mobility).

As part of switching from the first PCell to the second PCell, in method 800, at Block 806, the one or more target secondary nodes associated with the second PCell can be activated based on the CPC configuration for the second PCell. In an aspect, mobility performing component 352, e.g., in conjunction with processor(s) 312, memory 316, transceiver 302, UE communicating component 342, etc., can activate, based on the CPC configuration for the second PCell, the one or more target secondary nodes associated with the second PCell.

The UE 104, however, may not keep the CPC configuration (received as part of multi-SCG configuration) after successful PSCell change (which can be based on a network indication to keep or drop the CPC configuration). As such, for example, the UE can inform the network (NG-RAN) which CPC configurations were kept or released in successful PSCell change report or failure report. This can help the network to optimize a number of preferred SNs for each T-SN, a number of T-PSCells prepared in each preferred T-SN, and/or the execution conditions.

In method 900, at Block 906, an indication of whether the UE is to maintain or release the CPC configuration for a subset of the one or more PCells after switching to the second PCell can be transmitted. In an aspect, mobility instructing component 452, e.g., in conjunction with processor(s) 412, memory 416, transceiver 402, BS communicating component 442, etc., can transmit (e.g., to a UE 104) the indication of whether the UE is to maintain or release the CPC configuration for the subset of the one or more PCells after switching to the second PCell. For example, mobility instructing component 452 can transmit the indication to the UE 104 in RRC signaling, and can transmit the indication for all PCells or each specific PCell (or a currently configured PCell).

In method 800, at Block 808, the CPC configuration for a subset of the one or more PCells can be maintained or released after switching to the second PCell based on whether the network node indicates to maintain or release the CPC configuration. In an aspect, mobility performing component 352, e.g., in conjunction with processor(s) 312, memory 316, transceiver 302, UE communicating component 342, etc., can maintain or release the CPC configuration for a subset of the one or more PCells (e.g., not including the second PCell) after switching to the second PCell based on whether the network node indicates to maintain or release the CPC configuration.

In method 800, optionally at Block 810, an indication of maintained CPC configurations can be transmitted to the network node and based on maintaining or releasing the CPC configuration. In an aspect, mobility performing component 352, e.g., in conjunction with processor(s) 312, memory 316, transceiver 302, UE communicating component 342, etc., can transmit, to the network node and based on maintaining or releasing the CPC configuration, the indication of maintained CPC configurations. The indication of maintained CPC configurations can identify which CPC configurations are maintained at the UE 104. For example, mobility performing component 352 can transmit the indication of maintained CPC configurations in RRC signaling, uplink control information (UCI), etc. Mobility performing component 352 can transmit the indication in a PSCell change report (e.g., following switching to the PSCell) or in a failure report (e.g., where switching to the PSCell fails).

In method 900, optionally at Block 908, an indication of maintained CPC configurations can be received from the UE and based on maintaining or releasing the CPC configuration. In an aspect, mobility instructing component 452, e.g., in conjunction with processor(s) 412, memory 416, transceiver 402, BS communicating component 442, etc., can receive, from the UE and based on the UE maintaining or releasing the CPC configuration, an indication of maintained CPC configurations. In this example, mobility instructing component 452 can know which CPC configurations are still available at the UE 104 for subsequent PCell switching. Thus, if the UE is to switch to a PCell for which the CPC configuration is not maintained, mobility instructing component 452 can transmit the CPC configuration to the UE.

Figure 11:
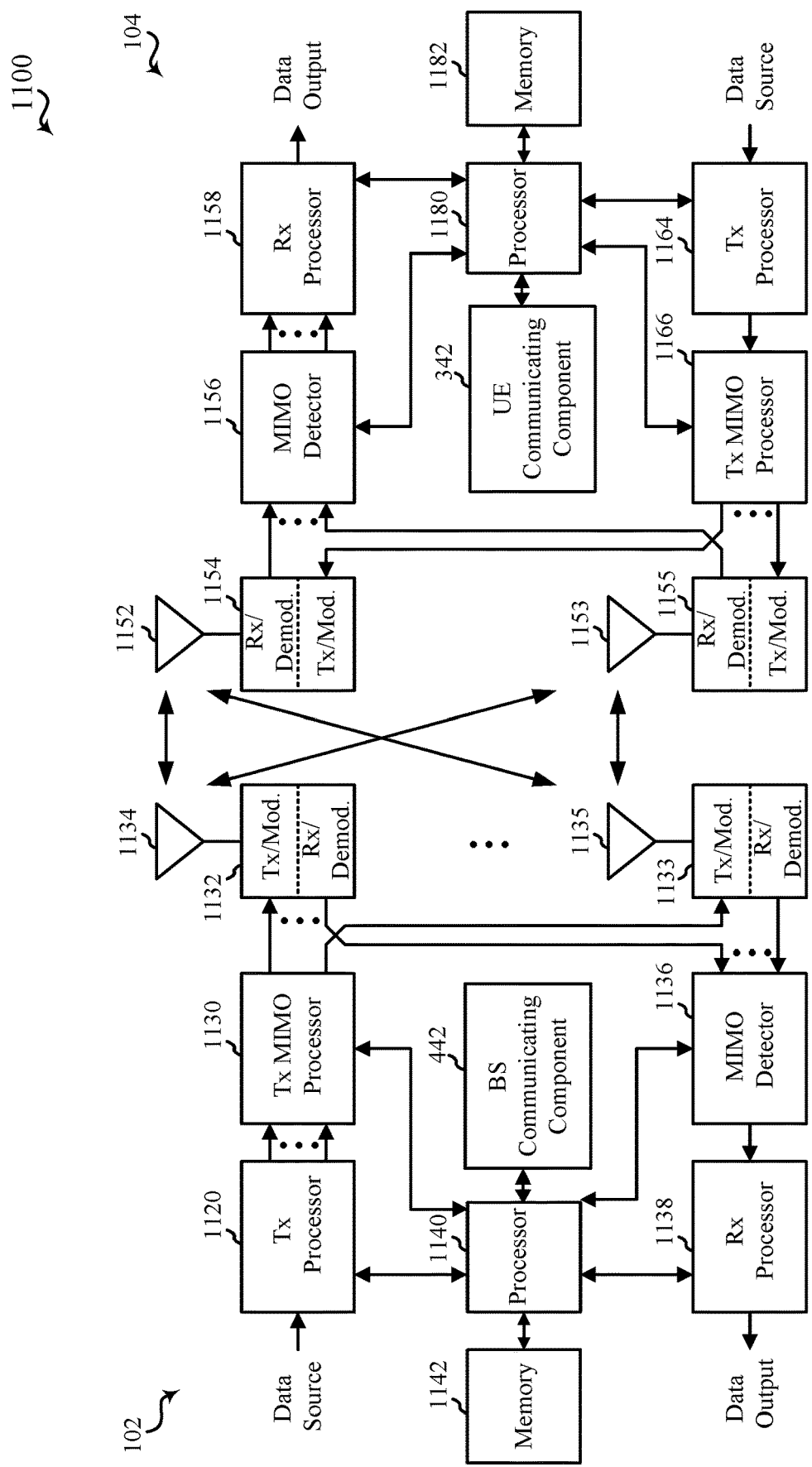
FIG. 11 is a block diagram illustrating an example of a multiple-input multiple-output (MIMO) communication system including a base station and a UE, in accordance with various aspects of the present disclosure.

FIG. 11 is a block diagram of a MIMO communication system 1100 including a base station 102 and a UE 104. The MIMO communication system 1100 may illustrate aspects of the wireless communication access network 100 described with reference to FIG. 1. The base station 102 may be an example of aspects of the base station 102 described with reference to FIG. 1. The base station 102 may be equipped with antennas 1134 and 1135, and the UE 104 may be equipped with antennas 1152 and 1153. In the MIMO communication system 1100, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1120 may receive data from a data source. The transmit processor 1120 may process the data. The transmit processor 1120 may also generate control symbols or reference symbols. A transmit MIMO processor 1130 may perform spatial processing (e.g., precoding) on data symbols, control symbols, or reference symbols, if applicable, and may provide output symbol streams to the transmit modulator/demodulators 1132 and 1133. Each modulator/demodulator 1132 through 1133 may process a respective output symbol stream (e.g., for OFDM, etc.) to obtain an output sample stream. Each modulator/demodulator 1132 through 1133 may further process (e.g., convert to analog, amplify, filter, and upconvert) the output sample stream to obtain a DL signal. In one example, DL signals from modulator/demodulators 1132 and 1133 may be transmitted via the antennas 1134 and 1135, respectively.

The UE 104 may be an example of aspects of the UEs 104 described with reference to FIGS. 1 and 3. At the UE 104, the UE antennas 1152 and 1153 may receive the DL signals from the base station 102 and may provide the received signals to the modulator/demodulators 1154 and 1155, respectively. Each modulator/demodulator 1154 through 1155 may condition (e.g., filter, amplify, downconvert, and digitize) a respective received signal to obtain input samples. Each modulator/demodulator 1154 through 1155 may further process the input samples (e.g., for OFDM, etc.) to obtain received symbols. A MIMO detector 1156 may obtain received symbols from the modulator/demodulators 1154 and 1155, perform MIMO detection on the received symbols, if applicable, and provide detected symbols. A receive (Rx) processor 1158 may process (e.g., demodulate, deinterleave, and decode) the detected symbols, providing decoded data for the UE 104 to a data output, and provide decoded control information to a processor 1180, or memory 1182.

The processor 1180 may in some cases execute stored instructions to instantiate a UE communicating component 342 (see e.g., FIGS. 1 and 3).

On the uplink (UL), at the UE 104, a transmit processor 1164 may receive and process data from a data source. The transmit processor 1164 may also generate reference symbols for a reference signal. The symbols from the transmit processor 1164 may be precoded by a transmit MIMO processor 1166 if applicable, further processed by the modulator/demodulators 1154 and 1155 (e.g., for single carrier-FDMA, etc.), and be transmitted to the base station 102 in accordance with the communication parameters received from the base station 102. At the base station 102, the UL signals from the UE 104 may be received by the antennas 1134 and 1135, processed by the modulator/demodulators 1132 and 1133, detected by a MIMO detector 1136 if applicable, and further processed by a receive processor 1138. The receive processor 1138 may provide decoded data to a data output and to the processor 1140 or memory 1142.

The processor 1140 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 1100. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 1100.

The following aspects are illustrative only and aspects thereof may be combined with aspects of other embodiments or teaching described herein, without limitation.

Aspect 1 is a method for wireless communication at a UE including receiving, from a network node, an indication of mobility from a first cell in a candidate cell set configured for L1/L2 mobility to a second cell, and transmitting, to a network node, one or more parameters related to mobility failure or mobility history or RLF associated with the mobility to assist the network node in at least one of performing a subsequent L1/L2 mobility for the UE or avoiding RLF or mobility failure during the subsequent L1/L2 mobility.

In Aspect 2, the method of Aspect 1 includes receiving, from the network node, an indication of the subsequent L1/L2 mobility for the UE between cells in the candidate cell set configured for L1/L2 mobility.

In Aspect 3, the method of any of Aspects 1 or 2 includes detecting, at the UE, RLF with the second cell, where the second cell is in the candidate cell set configured for L1/L2 mobility, and where transmitting the one or more parameters includes transmitting, to the network node, a RLF report with the one or more parameters indicating whether the indication of mobility is received before the RLF is detected.

In Aspect 4, the method of any of Aspects 1 to 3 includes detecting, at the UE, RLF with the second cell, where the second cell is in the candidate cell set configured for L1/L2 mobility, and where transmitting the one or more parameters includes transmitting, to the network node, a RLF report with the one or more parameters indicating at least one of a time difference between receiving the indication of mobility and detecting the RLF, or a time difference between performing the mobility and detecting the RLF.

In Aspect 5, the method of any of Aspects 1 to 4 includes detecting, at the UE, RLF with the second cell, and reconnection to the first cell, where the second cell is in the candidate cell set configured for L1/L2 mobility, and where transmitting the one or more parameters includes transmitting, to the network node, a RLF report with the one or more parameters indicating whether a last handover before detecting the RLF is a L3 mobility or a L1/L2 mobility.

In Aspect 6, the method of any of Aspects 1 to 5 includes detecting, at the UE, RLF with the second cell and connection to a third cell, where the second cell is in the candidate cell set configured for L1/L2 mobility, and where transmitting the one or more parameters includes transmitting, to the network node, a RLF report with the one or more parameters indicating L1/L2 cell measurements from cells within a cell set configured for L1/L2 mobility.

In Aspect 7, the method of any of Aspects 1 to 6 includes detecting, at the UE, L3 handover failure with the second cell, where the second cell is outside of the candidate cell set configured for L1/L2 mobility, and where transmitting the one or more parameters includes transmitting, to the network node, a RLF report with the one or more parameters indicating that the second cell is outside of the candidate cell set configured for L1/L2 mobility.

In Aspect 8, the method of any of Aspects 1 to 7 includes detecting, at the UE, L3 handover failure with the second cell, where the second cell is outside of the candidate cell set configured for L1/L2 mobility, where transmitting the one or more parameters includes transmitting, to the network node, at least one of a RRM measurement of whether a neighbor cell is part of the candidate cell set configured for L1/L2 mobility, or an indication of the candidate cell set configured for L1/L2 mobility.

In Aspect 9, the method of any of Aspects 1 to 8 includes detecting, at the UE, a cell switch failure from the first cell to the second cell, where the second cell is in the candidate cell set configured for L1/L2 mobility, and where transmitting the one or more parameters includes transmitting, to the network node, statistics on L1/L2 mobility at least one of between cells in the candidate cell set configured for L1/L2 mobility or between the first cell and the second cell.

In Aspect 10, the method of any of Aspects 1 to 9 where transmitting the one or more parameters includes transmitting, to the network node, an indication in a mobility history report of whether the mobility is a L3 mobility or an L1/L2 mobility.

Aspect 11 is a method for wireless communication at a UE including receiving, from a network node, a CPC configuration for each of one or more primary cells indicating one or more target secondary nodes to activate based on activating the primary cell, receiving, from the network node, a command to switch from a first primary cell to a second primary cell, activating, based on the CPC configuration for the second primary cell, the one or more target secondary nodes associated with the second primary cell, and maintaining or releasing the CPC configuration for a subset of the one or more primary cells after switching to the second primary cell based on whether the network node indicates to the UE to maintain or release the CPC configuration.

In Aspect 12, the method of Aspect 11 includes transmitting, to the network node and based on maintaining or releasing the CPC configuration, an indication of CPC configurations maintained at the UE.

Aspect 13 is a method for wireless communication at a network node including transmitting, to a UE, a network node, an indication of mobility from a first cell in a candidate cell set configured for L1/L2 mobility to a second cell, and receiving, from the UE, one or more parameters related to mobility failure or mobility history or RLF associated with the mobility to assist the network node in at least one of performing a subsequent L1/L2 mobility for the UE or avoiding RLF or mobility failure during the subsequent L1/L2 mobility.

In Aspect 14, the method of Aspect 13 includes transmitting, to the UE and based on the one or more parameters, an indication of the subsequent L1/L2 mobility for the UE between cells in the candidate cell set configured for L1/L2 mobility.

In Aspect 15, the method of any of Aspects 13 or 14 includes where the second cell is in the candidate cell set configured for L1/L2 mobility, and where receiving the one or more parameters includes receiving, from the UE, a RLF report with the one or more parameters indicating whether the indication of mobility is received before an RLF is detected.

In Aspect 16, the method of any of Aspects 13 to 15 includes where the second cell is in the candidate cell set configured for L1/L2 mobility, and where receiving the one or more parameters includes receiving, from the UE, a RLF report with the one or more parameters indicating at least one of a time difference between receiving the indication of mobility and detecting an RLF, or a time difference between performing the mobility and detecting the RLF.

In Aspect 17, the method of any of Aspects 13 to 16 includes where the second cell is in the candidate cell set configured for L1/L2 mobility, and where receiving the one or more parameters includes receiving, from the UE, a RLF report with the one or more parameters indicating whether a last handover before detecting an RLF is a L3 mobility or a L1/L2 mobility.

In Aspect 18, the method of any of Aspects 13 to 17 includes where the second cell is in the candidate cell set configured for L1/L2 mobility, and where receiving the one or more parameters includes receiving, from the UE, a RLF report with the one or more parameters indicating L1/L2 cell measurements from cells within a L1/L2 mobility configured cell set.

In Aspect 19, the method of any of Aspects 13 to 18 includes where the second cell is outside of the candidate cell set configured for L1/L2 mobility, and where receiving the one or more parameters includes receiving, from the UE, a RLF report with the one or more parameters indicating that the second cell is outside of the candidate cell set configured for L1/L2 mobility.

In Aspect 20, the method of any of Aspects 13 to 19 includes where the second cell is outside of the candidate cell set configured for L1/L2 mobility, where receiving the one or more parameters includes receiving, from the UE, at least one of a RRM measurement of whether a neighbor cell is part of the candidate cell set configured for L1/L2 mobility, or an indication of the candidate cell set configured for L1/L2 mobility.

In Aspect 21, the method of any of Aspects 13 to 20 includes where the second cell is in the candidate cell set configured for L1/L2 mobility, and where receiving the one or more parameters includes receiving, from the UE, statistics on L1/L2 mobility at least one of between cells in the candidate cell set configured for L1/L2 mobility or between the first cell and the second cell.

In Aspect 22, the method of any of Aspects 13 to 21 includes where receiving the one or more parameters includes receiving, from the UE, an indication in a mobility history report of whether the mobility is a L3 mobility or an L1/L2 mobility.

In Aspect 23, the method of any of Aspects 13 to 22 includes including, based on the one or more parameters, an indication in a UE history information of whether the mobility is a L3 mobility or an L1/L2 mobility.

Aspect 24 is a method for wireless communication at a network node including transmitting, to a UE, a CPC configuration for each of one or more primary cells indicating one or more target secondary nodes to activate based on activating the primary cell, transmitting, to the UE, a command to switch from a first primary cell to a second primary cell, and transmitting, to the UE, an indication of whether the UE is to maintain or release the CPC configuration for a subset of the one or more primary cells after switching to the second primary cell.

In Aspect 25, the method of Aspect 24 includes receiving, from the UE and based on maintaining or releasing the CPC configuration, an indication of CPC configurations maintained at the UE.

Aspect 26 is an apparatus for wireless communication including a processor, memory coupled with the processor, and instructions stored in the memory and operable, when executed by the processor, to cause the apparatus to perform any of the methods of Aspects 1 to 25.

Aspect 27 is an apparatus for wireless communication including means for performing any of the methods of Aspects 1 to 25.

Aspect 28 is a computer-readable medium including code executable by one or more processors for wireless communications, the code including code for performing any of the methods of Aspects 1 to 25.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a processor;
memory coupled with the processor; and
instructions stored in the memory and operable, when executed by the processor, to cause the apparatus to:
receive, from a network node, an indication of mobility from a first cell in a candidate cell set configured for layer 1 (L1)/layer 2 (L2) mobility to a second cell; and
transmit, to the network node or another network node, one or more parameters related to mobility failure or mobility history or radio link failure (RLF) associated with the mobility to assist the network node in at least one of performing a subsequent L1/L2 mobility for the apparatus or avoiding RLF or mobility failure during the subsequent L1/L2 mobility, wherein the one or more parameters include
an indication of a percentage of successful L1/L2 mobility procedures at least one of between cells in the candidate cell set configured for L1/L2 mobility or between the first cell and the second cell.

2. The apparatus of claim 1, wherein the instructions, when executed by the processor, cause the apparatus to receive, from the network node, an indication of the subsequent L1/L2 mobility for the apparatus between cells in the candidate cell set configured for L1/L2 mobility.

3. The apparatus of claim 1, wherein the instructions, when executed by the processor, cause the apparatus to detect RLF with the second cell, wherein the second cell is in the candidate cell set configured for L1/L2 mobility, and wherein the instructions, when executed by the processor, cause the apparatus to transmit, to the network node, a RLF report with the one or more parameters and indicating whether the indication of mobility is received before the RLF is detected.

4. The apparatus of claim 1, wherein the instructions, when executed by the processor, cause the apparatus to detect RLF with the second cell, wherein the second cell is in the candidate cell set configured for L1/L2 mobility, and wherein the instructions, when executed by the processor, cause the apparatus to transmit, to the network node, a RLF report with the one or more parameters and indicating a time difference between receiving the indication of mobility and detecting the RLF.

5. The apparatus of claim 1, wherein the instructions, when executed by the processor, cause the apparatus to detect RLF with the second cell, and reconnection to the first cell, wherein the second cell is in the candidate cell set configured for L1/L2 mobility, and wherein the instructions, when executed by the processor, cause the apparatus to transmit, to the network node, a RLF report with the one or more parameters indicating whether a last handover before detecting the RLF is a layer 3 (L3) mobility or a L1/L2 mobility.

6. The apparatus of claim 1, wherein the instructions, when executed by the processor, cause the apparatus to detect RLF with the second cell and connection to a third cell, wherein the second cell is in the candidate cell set configured for L1/L2 mobility, and wherein the instructions, when executed by the processor, cause the apparatus to transmit, to the network node, a RLF report with the one or more parameters indicating L1/L2 cell measurements from cells within the candidate cell set configured for L1/L2 mobility.

7. The apparatus of claim 1, wherein the instructions, when executed by the processor, cause the apparatus to detect layer 3 (L3) handover failure with the second cell, wherein the second cell is outside of the candidate cell set configured for L1/L2 mobility, and wherein the instructions, when executed by the processor, cause the apparatus to transmit, to the network node, a RLF report with the one or more parameters indicating that the second cell is outside of the candidate cell set configured for L1/L2 mobility.

8. The apparatus of claim 1, wherein the instructions, when executed by the processor, cause the apparatus to detect layer 3 (L3) handover failure with the second cell, wherein the second cell is outside of the candidate cell set configured for L1/L2 mobility, wherein the instructions, when executed by the processor, cause the apparatus to transmit, to the network node, at least one of:
a radio resource management (RRM) measurement of whether a neighbor cell is part of the candidate cell set configured for L1/L2 mobility; or
an indication of the candidate cell set configured for L1/L2 mobility.

9. The apparatus of claim 1, wherein the instructions, when executed by the processor, cause the apparatus to detect a cell switch failure from the first cell to the second cell, wherein the second cell is in the candidate cell set configured for layer 1 (L1)/layer 2 (L2) mobility.

10. The apparatus of claim 1, wherein the instructions, when executed by the processor, cause the apparatus to transmit, to the network node, an indication in a mobility history report of whether the mobility is a layer 3 (L3) mobility or an L1/L2 mobility.

11. An apparatus for wireless communication, comprising:
a processor;
memory coupled with the processor; and
instructions stored in the memory and operable, when executed by the processor, to cause the apparatus to:
transmit, to a user equipment (UE), a network node, an indication of mobility from a first cell in a candidate cell set configured for layer 1 (L1)/layer 2 (L2) mobility to a second cell; and
receive, from the UE, one or more parameters related to mobility failure or mobility history or radio link failure (RLF) associated with the mobility to assist the network node in at least one of performing a subsequent L1/L2 mobility for the UE or avoiding RLF or mobility failure during the subsequent L1/L2 mobility, wherein the one or more parameters include
an indication of a percentage of successful L1/L2 mobility procedures at least one of between cells in the candidate cell set configured for L1/L2 mobility or between the first cell and the second cell.

12. The apparatus of claim 11, wherein the instructions, when executed by the processor, cause the apparatus to transmit, to the UE and based on the one or more parameters, an indication of the subsequent L1/L2 mobility for the UE between cells in the candidate cell set configured for L1/L2 mobility.

13. The apparatus of claim 11, wherein the second cell is in the candidate cell set configured for L1/L2 mobility, and wherein the instructions, when executed by the processor, cause the apparatus to receive, from the UE, a RLF report with the one or more parameters indicating whether the indication of mobility is received before an RLF is detected.

14. The apparatus of claim 11, wherein the second cell is in the candidate cell set configured for L1/L2 mobility, and wherein the instructions, when executed by the processor, cause the apparatus to receive, from the UE, a RLF report with the one or more parameters indicating a time difference between receiving the indication of mobility and detecting an RLF.

15. The apparatus of claim 11, wherein the second cell is in the candidate cell set configured for L1/L2 mobility, and wherein the instructions, when executed by the processor, cause the apparatus to receive, from the UE, a RLF report with the one or more parameters indicating whether a last handover before detecting an RLF is a layer 3 (L3) mobility or a L1/L2 mobility.

16. The apparatus of claim 11, wherein the second cell is in the candidate cell set configured for L1/L2 mobility, and wherein the instructions, when executed by the processor, cause the apparatus to receive, from the UE, a RLF report with the one or more parameters indicating L1/L2 cell measurements from cells within the candidate cell set configured for L1/L2 mobility.

17. The apparatus of claim 11, wherein the second cell is outside of the candidate cell set configured for L1/L2 mobility, and wherein the instructions, when executed by the processor, cause the apparatus to receive, from the UE, a RLF report with the one or more parameters indicating that the second cell is outside of the candidate cell set configured for L1/L2 mobility.

18. The apparatus of claim 11, wherein the second cell is outside of the candidate cell set configured for L1/L2 mobility, wherein the instructions, when executed by the processor, cause the apparatus to receive, from the UE, at least one of:
a radio resource management (RRM) measurement of whether a neighbor cell is part of the candidate cell set configured for L1/L2 mobility; or
an indication of the candidate cell set configured for L1/L2 mobility.

19. The apparatus of claim 11, wherein the second cell is in the candidate cell set configured for L1/L2 mobility.

20. The apparatus of claim 11, wherein the instructions, when executed by the processor, cause the apparatus to receive, from the UE, an indication in a mobility history report of whether the mobility is a layer 3 (L3) mobility or an L1/L2 mobility.

21. The apparatus of claim 11, wherein the instructions, when executed by the processor, cause the apparatus to include, based on the one or more parameters, an indication in a UE history information of whether the mobility is a layer 3 (L3) mobility or an L1/L2 mobility.

22. A method for wireless communication at a user equipment (UE), comprising:
receiving, from a network node, an indication of mobility from a first cell in a candidate cell set configured for layer 1 (L1)/layer 2 (L2) mobility to a second cell; and
transmitting, to the network node or another network node, one or more parameters related to mobility failure or mobility history or radio link failure (RLF) associated with the mobility to assist the network node in at least one of performing a subsequent L1/L2 mobility for the UE or avoiding RLF or mobility failure during the subsequent L1/L2 mobility, wherein the one or more parameters include
an indication of a percentage of successful L1/L2 mobility procedures at least one of between cells in the candidate cell set configured for L1/L2 mobility or between the first cell and the second cell.

23. The method of claim 22, further comprising receiving, from the network node, an indication of the subsequent L1/L2 mobility for the UE between cells in the candidate cell set configured for L1/L2 mobility.

24. The method of claim 22, further comprising detecting, at the UE, RLF with the second cell, wherein the second cell is in the candidate cell set configured for L1/L2 mobility, and wherein transmitting the one or more parameters includes transmitting, to the network node, a RLF report with the one or more parameters indicating whether the indication of mobility is received before the RLF is detected.

25. The method of claim 22, further comprising detecting, at the UE, RLF with the second cell, wherein the second cell is in the candidate cell set configured for L1/L2 mobility, and wherein transmitting the one or more parameters includes transmitting, to the network node, a RLF report with the one or more parameters indicating a time difference between receiving the indication of mobility and detecting the RLF.

26. The method of claim 22, further comprising detecting, at the UE, RLF with the second cell, and reconnection to the first cell, wherein the second cell is in the candidate cell set configured for L1/L2 mobility, and wherein transmitting the one or more parameters includes transmitting, to the network node, a RLF report with the one or more parameters indicating whether a last handover before detecting the RLF is a layer 3 (L3) mobility or a L1/L2 mobility.

27. The method of claim 22, further comprising detecting, at the UE, RLF with the second cell and connection to a third cell, wherein the second cell is in the candidate cell set configured for L1/L2 mobility, and wherein transmitting the one or more parameters includes transmitting, to the network node, a RLF report with the one or more parameters indicating L1/L2 cell measurements from cells within the candidate cell set configured for L1/L2 mobility.

28. The method of claim 22, further comprising detecting, at the UE, layer 3 (L3) handover failure with the second cell, wherein the second cell is outside of the candidate cell set configured for L1/L2 mobility, and wherein transmitting the one or more parameters includes transmitting, to the network node, a RLF report with the one or more parameters indicating that the second cell is outside of the candidate cell set configured for L1/L2 mobility.

29. A method for wireless communication at a network node, comprising:

transmitting, to a user equipment (UE), a network node, an indication of mobility from a first cell in a candidate cell set configured for layer 1 (L1)/layer 2 (L2) mobility to a second cell; and receiving, from the UE, one or more parameters related to mobility failure or mobility history or radio link failure (RLF) associated with the mobility to assist the network node in at least one of performing a subsequent L1/L2 mobility for the UE or avoiding RLF or mobility failure during the subsequent L1/L2 mobility, wherein the one or more parameters include an indication of a percentage of successful L1/L2 mobility procedures at least one of between cells in the candidate cell set configured for L1/L2 mobility or between the first cell and the second cell.

30. The method of claim 29, further comprising transmitting, to the UE and based on the one or more parameters, an indication of the subsequent L1/L2 mobility for the UE between cells in the candidate cell set configured for L1/L2 mobility.

* * * * *